United States Patent [19]

Umeha et al.

[11] Patent Number: 4,513,977
[45] Date of Patent: Apr. 30, 1985

[54] STEEL FLOATING SEAL WITH REMELTED DEPOSIT-ALLOYED WEAR SURFACES

[75] Inventors: Genkichi Umeha, Tokyo; Takeshi Hiraoka, Saitama, both of Japan

[73] Assignee: Nippon Piston Ring Co., Ltd., Tokyo, Japan

[21] Appl. No.: 530,151

[22] Filed: Sep. 7, 1983

[30] Foreign Application Priority Data

Sep. 7, 1982 [JP] Japan .................... 57-134910[U]

[51] Int. Cl.³ .................... C23F 7/04; C21D 1/78; F16J 15/34; F16J 15/28
[52] U.S. Cl. .................... 277/96.2; 277/84; 277/83; 277/173; 277/236; 277/DIG. 6; 148/1; 148/4; 148/13
[58] Field of Search .................... 277/81 R, 83, 84, 96, 277/96.1, 96.2, 81 P, 236, DIG. 6, 173; 148/1, 3, 4, 35, 39, 138, 139; 164/127; 418/178, 179

[56] References Cited

U.S. PATENT DOCUMENTS

| | | | |
|---|---|---|---|
| 3,752,243 | 8/1973 | Hummer et al. | 277/96.2 X |
| 3,802,927 | 4/1974 | Gomada | 148/4 |
| 3,810,637 | 5/1974 | Bonvin | 277/96.2 |
| 4,000,011 | 12/1976 | Sato et al. | 148/4 |
| 4,122,240 | 10/1978 | Banas et al. | 148/13 X |
| 4,132,419 | 1/1979 | Sunami et al. | 277/96.2 |
| 4,153,477 | 5/1979 | Beyer et al. | 148/1 |
| 4,157,923 | 6/1979 | Yen et al. | 148/4 |
| 4,351,533 | 9/1982 | Moore | 277/84 X |
| 4,386,969 | 6/1983 | Kilbert | 277/96.2 X |

Primary Examiner—Robert S. Ward
Attorney, Agent, or Firm—Sughrue, Mion, Zinn, Macpeak, & Seas

[57] ABSTRACT

A floating seal provided at its seal face with a hardened portion, in which the body of the floating seal is made of steel, and in which the sealing member is provided at its seal face with a deposit-alloyed surface obtained by surface remelting.

4 Claims, 2 Drawing Figures

STEEL FLOATING SEAL WITH REMELTED DEPOSIT-ALLOYED WEAR SURFACES

BACKGROUND OF THE INVENTION

The present invention relates to a floating seal used as a sealing device for a rotary shaft in a machine such as a construction vehicle, or other construction equipment or the like.

As shown in FIG. 1 floating seals 5, 5 are disposed at an end of a rotary shaft 1 such that they are in contact with a casing 2 and a rotary plate 3 through O-rings 4, 4 respectively, Thus, silt, dust, waste water, and the like are prevented from entering through a gap between the casing 2 and the rotary plate 3 by seal faces 6, 6 of the respective floating seals 5, 5, and the O-rings 4 and 4. The seal faces 6, 6 are required to be wear resistant since they have to relatively slide at the rotational speed of the rotary shaft 1.

Accordingly, a material which is particularly superior in wear resistance, such as alloyed cast iron, chilled cast iron, or the like, is used for the floating seal. However, such wear proof cast irons are not so good in machinability, castability and producibility, while being superior in wear resistance.

To solve this problem, there has been proposed a composite floating seal in which a wear resistant material is disposed at only the seal face at which wear resistance is required, or a floating seal in which the seal face of a base metal of steel is processed to provide wear resistance thereat by a method such as boronizing. There are questions, however, regarding the strength of the junction portion in cases where different materials are compounded. There are also disadvantages where the wear resistant surface processing is performed by a surface coating method such as metal plating, metal spraying, or the like. Where the floating seal is subject to abrasion with strong contact pressure, the coating is apt to come off. In the case where the wear resistant surface processing is performed by a method such as boronizing, ion nitriding, or the like, it is difficult to obtain a sufficiently deep hardened layer as well as difficult to obtain the necessary wear resistance even if the surface hardening processing is performed, unless the base metal of substrate per se has hardness to a certain extent.

SUMMARY OF THE INVENTION

An object of the present invention is therefore to provide a floating seal of the type mentioned above, having a surface which is sufficiently wear resistant and which is superior in machinability as well as producibility.

The floating seal according to the present invention has two characteristic features as described in detail hereafter:

(1) The body of the floating seal is made of steel; and
(2) The floating seal has, at its seal face, a remelted and deposit-alloyed surface.

DETAILED DESCRIPTION OF THE PREFERRED EMBODIMENTS

Figure 1:
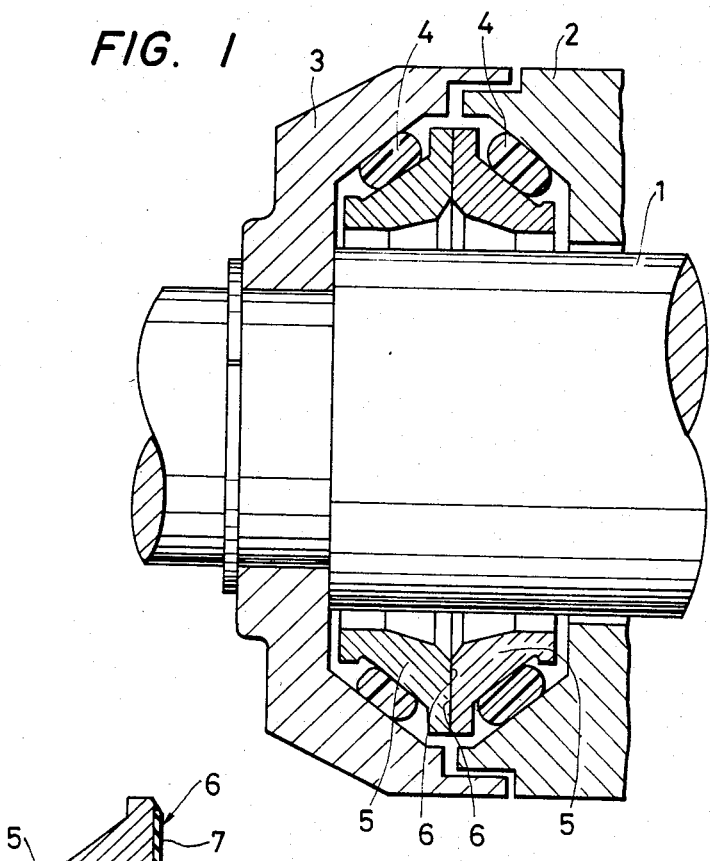
FIG. 1 is a cross-sectional view illustrating the use of floating seals.
Figure 2:
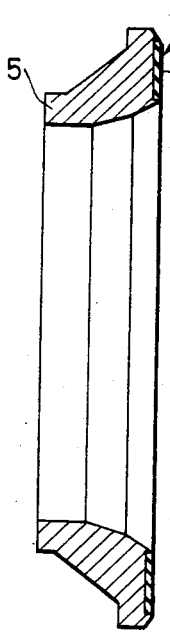
FIG. 2 is a cross-sectional view of a floating seal member according to the present invention.

Referring to FIG. 2, an embodiment of the present invention will now be described.

As shown in FIG. 2, a floating seal member according to the present invention has a floating seal body 5 and a deposit-alloyed surface 7 at its seal face 6. The deposit-alloyed surface 7 is obtained in a manner such that the seal face is remelted, and at the same time an alloying element is added thereto so that the surface is melted and the melted surface layer is simultaneously alloyed.

Accordingly, the depth of the deposit-alloyed layer is determined depending on the depth of surface melting on one hand, and it is made possible, by the added alloying element, to obtain an alloy which cannot be obtained by an ordinary metallurgical method.

Further, the surface structure is martensited and at the same time made remarkably dense to thereby obtain a very hard surface, since it takes a very short time to cool the surface remelted steel from the remelted state. Also it is simultaneously possible to obtain a surface structure having higher hardness and density by adding the alloying elements.

More particularly, in the case where carbide forming elements are represented by Cr, W, V, Ti, Co and Nb and carbon C are used, the deposit-alloyed layer which is obtained by being remelted and then cooled has a very hard and remarkably dense structure in which carbides of Cr, W, V, Ti, Co, Nb, etc. and compound carbides of the same are finely dispersed in a martensited substrate.

The thus obtained deposit-alloyed surface is superior in wear proofing, particularly in abrasion wear resistance, because of its remarkably high hardness and density. This is because the actual metal-to-metal contact area can be reduced so as to lower the coefficient of friction to suppress the progress of microscopic adhesive abrasion due to the high hardness. Further, since the structure is dense and superior in strength, the progress of wear can be suppressed, and the coming off or peeling off of carbide particles from the surface can be reduced because of the existence of different particles, so that abrasive wear can be prevented from progressing.

Further, since the deposit-alloyed layer can be obtained to the depth of the remelted layer, it is easy to form a deposit-alloyed layer having a depth of several millimeters, so that the layer can be prevented from wearing out for a long time.

To form such a deposit-alloyed surface, a heat source of high density, such as a laser beam, an electron beam, a tungsten inert gas arc, a plasma arc, or the like, which are ordinary surface melting means, is utilized. Further, with respect to the addition of the alloying elements, a method can be used in which alloying elements in wire form are added into the melt at the surface of the steel. In this case, however, the supplied amount of alloy material is apt to be excessive with respect to the melted region. It is possible to obtain a stable alloyed layer in a manner such that the surface is coated with the alloying elements in advance by metal plating, metal spraying, or the like, and then the coating and the steel substrate are melted together.

In the surface remelting process, there is a fear of the generation of blow holes caused by remelting. Since the substrate is of steel, however, there are no free graphite particles in the substrate which might cause such blow holes, so that a stable remelted layer can be obtained.

As described above, the floating seal according to the present invention is superior in abrasive wear resistance because it is provided at its seal face with a deposit-alloyed surface which is obtianed by remelting and cooling the seal surface. The seal members can be easily formed by forging and are superior in machinability as well as in strength since the substrates thereof are made of steel.

What is claimed is:

1. A floating seal comprising; a seal member having a seal face and a body, said body being formed of steel, said seal member being provided at said seal face with a surface remelted, deposit-alloyed surface having a thickness on the order of several millimeters, portions of said steel body adjacent said seal face being martensited.

2. A device as claimed in claim 1, wherein said surface remelted, deposit-alloyed surface includes alloying elements comprised of carbide forming materials.

3. A method of producing a seal member for a floating seal, comprising;

forming a base body of steel, said base body having a seal face;

heating said seal face using a high density energy beam to an extent such as to melt said seal face;

simultaneously adding alloying elements comprised of carbide forming elements to said seal face by depositing said alloying elements by a plating technique; and cooling said seal face to form a surface remelted deposit-alloyed layer on said base body and a martensited region of said base body near said seal face 4. A method of producing a seal member for a floating seal, comprising;

forming a base body of steel, said base body having a seal face, forming a layer of alloying elements on said seal face by plating, said alloying elements comprising carbide forming elements; heating said seal face and said layer of alloying elements so as to melt the same, using a high density energy beam as a heating source; and cooling said seal face to form a surface remelted-alloyed layer on said base body with portions of said base body near said seal face forming martensited regions.

* * * * *